Figure 1:
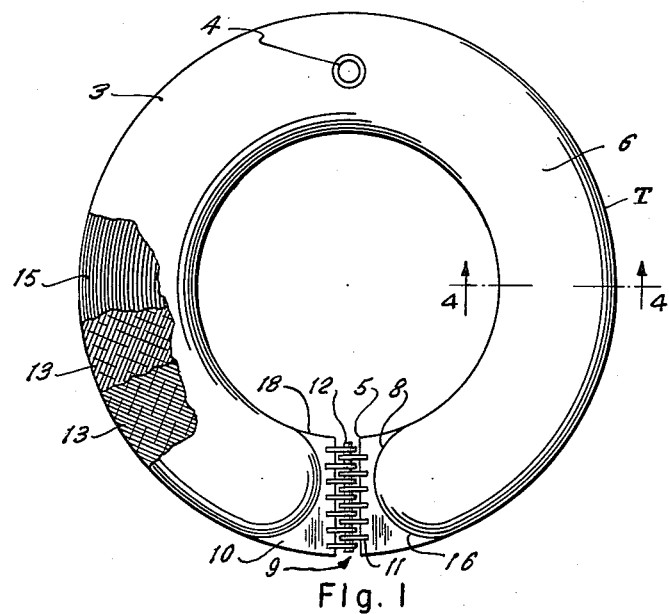
Figure 2:
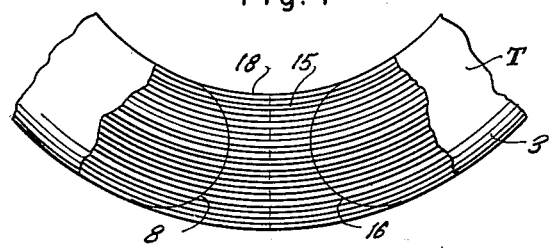
Figure 3:
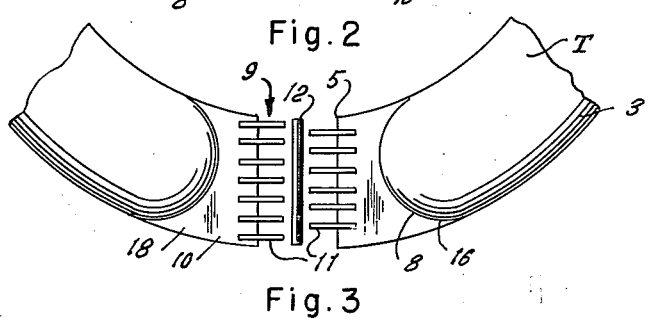
Figure 4:
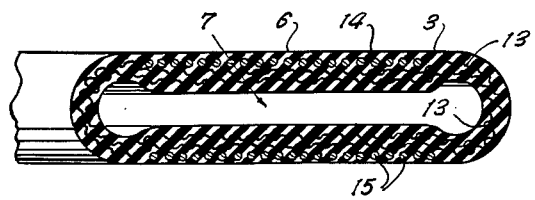

Nov. 12, 1963  H. E. BOWERMAN  3,110,230
CLOSURED END SPLIT CLUTCH TUBE
Filed Jan. 13, 1958

INVENTOR
Hulie E. Bowerman

BY
ATTORNEY

# 3,110,230
CLOSURED END SPLIT CLUTCH TUBE
Hulie E. Bowerman, 904 Meadow Oaks, Arlington, Tex.
Filed Jan. 13, 1958, Ser. No. 708,612
2 Claims. (Cl. 92—92)

This invention relates to flexible inflatable tubes which are designed to expand under pressure to operate or engage another mechanism such as a brake or clutch. These tubes are referred to generally as "clutch tubes" although they may be employed in a variety of installations and not limited to clutch actuation.

A primary object of this invention is to provide a clutch tube which may be used to engage an operating mechanism on a shaft, and yet which clutch tube may be readily removed from the shaft and replaced when necessary.

Another object is to provide a relatively flat circular clutch tube whose circumference surrounds the shaft and is continuous to provide an equal application of force when inflated, but wherein the continuous circumference includes a separable joint to permit removal from the shaft without disturbing other mechanism on the shaft. Another object is to provide a separable tube so reinforced against centrifugal forces that it may be operated at high speeds.

Another object is to provide an extremely rugged and yet practical and efficient device for the purpose intended.

These and other objects will be apparent from an examination of the following specification and drawings in which:

FIGURE I represents a fragmentary plan view of the clutch tube of this invention showing the end attaching means of the preferred embodiment.

FIGURE II is a fragmentary detail plan view of the circularly disposed reinforcing cords of the tube during manufacture.

FIGURE III is an exploded view of the tube with ends disconnected.

FIGURE IV is an enlarged section of the tube of FIGURE I, along line 4—4.

Referring more particularly to the characters of reference in the drawing, it will be observed that the complete tube structure T of this invention consists basically of circular disk type annulus tube 3 which is is inflatable by means of spud 4 and which is split radially at 5. The tube 3 includes a relatively thick elongated side wall 6 which encloses a cavity 7 to be filled with pressurized fluid for inflation purposes. The ends of tube 3 adjacent the split 5 are identified generally at 8.

In operation the detachable end members are securely joined as at FIGURE I so that the tube T functions identically to other similar disk type clutch tubes, as for example the tube shown in Patent 2,688,983, to H. E. Bowerman, dated Sept. 14, 1954. However, when it becomes necessary to remove or replace this latter clutch tube, it is necessary to remove all of the component machinery parts which may be installed on the shaft together with the clutch tube. This latter operation may be extremely difficult and is always more expensive than to simply slip in a new clutch tube radially of the shaft which is rendered possible by the separable clutch tube of this invention. In fact, this improved split clutch tube may be used to replace old style continuous clutch tubes without disturbing other components on the shaft by the expedient of simply cutting the old tube at some radial line and removing from the shaft, and then inserting the new separable tube in place and connecting the end joining means.

In FIGURES I-III the joining means indicated generally at 9 includes the utilization of flattened end tabs 10 including eyelets or hooks 11 thru which a fastening agent, in this case, rawhide pin 12, is threaded. As will be seen by reference to FIGURES I and III, the hooks 11 intermesh with each other so that a clear but snug alignment of their openings results thru which the pin 12 may be inserted. The hooks 11 will not normally extend above the deflated height at the top or bottom surfaces 14 of FIGURE IV so that there is no metal-to-metal contact with adjacent parts. This feature is desirable since it prevents the attaching means from coming into contact with face plate or other mechanism to be operated by the clutch.

The advantage of using the detachable end members hereinbefore mentioned, is so that a continuous ring clutch tube may be installed and removed from a shaft in an expedient manner; and the advantage of attaching the free ends of the tube as against leaving the ends free is that the clutch tube cannot become dislodged or distorted under the increased centrifugal force which is encountered on shafts rotating at high r.p.m.

In manufacturing my tube in a preferred form I employ biased cords 13—13 in the walls of my tube, covered with rubber, whereby to resist the forces of inflation and circularly disposed cords 15 to resist centrifugal forces upon rotation of the tube. In manufacturing my tube I build a closed end structure indicated at 16, joined at 18 by flat extensions then impose circular cords 15 spanning extensions 18. Then curing the tube and finally in securing the extensions 18 and cords 15 and then in attaching the eyelets 11 to the flat extensions and the cords whereby the tube may be secured in operative position by pin 12.

Other forms of and means for securing the ends of my split tube will readily occur to those skilled in the art and all such are meant to be included as fall within the scope of the appended claims.

What I claim is:
1. An inflatable actuator for use in rotating machinery, said actuator comprising a resilient flattened substantially-toroidal tube including circumferentially extending mutually-parallel side wall portions joined by rounded inner and outer end wall portions, said side wall portions, in one circumferential location converging and uniting to form a flat tab portion divided along a line disposed radially of the toroid into opposed flattened end tabs; fabric reinforcements embedded in the side and end wall portions and extending into the tabs; and fastener means extending across the ends of the tabs and anchored in the fabric reinforcements, said fastener means releasably securing said ends to make the actuator circumferentially continuous.

2. In an actuator as set forth in claim 1, the fabric reinforcements in the wall portions comprising reinforcing cords circumferentially disposed and bonded in at least some of said wall portions and extending substantially to the opposed ends of said tabs; and said fastener means comprising belt hooks arranged coextensively with radial extent of said tabs.

References Cited in the file of this patent
UNITED STATES PATENTS

| | | |
|---|---|---|
| 1,833,697 | Walus | Nov. 24, 1931 |
| 1,970,802 | Johnson | Aug. 21, 1934 |
| 2,145,289 | Boudreaux | Jan. 31, 1939 |
| 2,213,000 | Fawick | Aug. 27, 1940 |
| 2,395,239 | White et al. | Feb. 19, 1946 |
| 2,688,983 | Bowerman | Sept. 14, 1954 |
| 2,742,654 | Hurt | Apr. 24, 1956 |
| 2,748,401 | Winstead | June 5, 1956 |
| 2,774,453 | Wilson | Dec. 18, 1956 |
| 2,887,202 | Wilson | May 19, 1959 |

FOREIGN PATENTS

| | | |
|---|---|---|
| 161,623 | Switzerland | May 15, 1933 |